A. J. PAULY.
POTATO PLANTING MACHINE.
APPLICATION FILED MAY 3, 1911.
1,061,490.
Patented May 13, 1913.
2 SHEETS—SHEET 1.
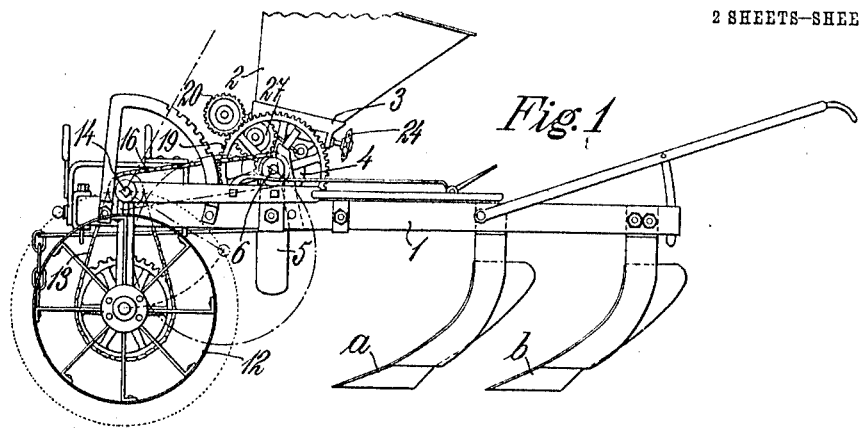
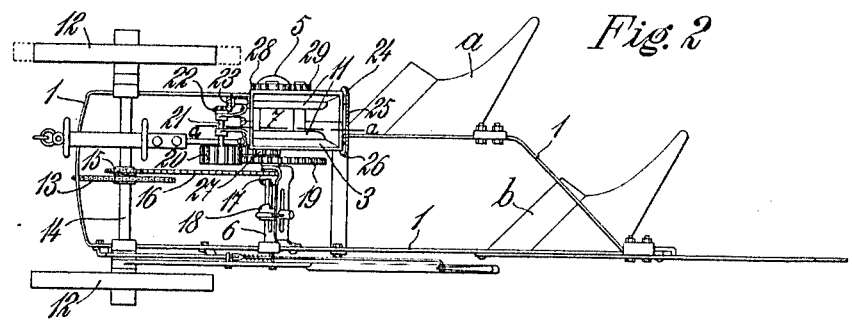

A. J. PAULY.
POTATO PLANTING MACHINE.
APPLICATION FILED MAY 3, 1911.

1,061,490.

Patented May 13, 1913.

2 SHEETS—SHEET 2.

Witnesses:
Olive D. White
Helen S. Morris

Inventor:
Anton James Pauly
By [signature]
Attorney

UNITED STATES PATENT OFFICE.

ANTON JAMES PAULY, OF STOCKERAU, AUSTRIA-HUNGARY.

POTATO-PLANTING MACHINE.

1,061,490.  Specification of Letters Patent.  Patented May 13, 1913.

Application filed May 3, 1911. Serial No. 624,709.

*To all whom it may concern:*

Be it known that I, ANTON JAMES PAULY, a subject of the Austrian Emperor, and residing at Stockerau, Lower Austria, Austria-Hungary, have invented certain new and useful Improvements in Potato-Planting Machines, of which the following is a specification.

The present invention relates to a potato planting machine of the type in which the seed potatoes fall out of the container or hopper by gravity into recesses in a distribution disk rotating on a horizontal shaft beneath the container.

The present invention consists in apparatus for potato planting machines of the above type the most important feature of which consists in so arranging the front peripheral edge of each recess in the direction of rotation of the distributer disk, that it is at a greater distance from the axis than the back edges of the recess, in order to move the contents of the container forward each time before a potato falls into a recess of the distributer disk.

The invention also consists in the provision of agitating and dispersing rollers in the container to prevent the formation of hollow internal spaces within the grouped seed in the container and also in the provision of devices for removing potatoes which may become jammed in the recesses of the distribution disk.

Reference will now be made to the accompanying drawings showing several modifications of the machine and in which:—

Figure 7:
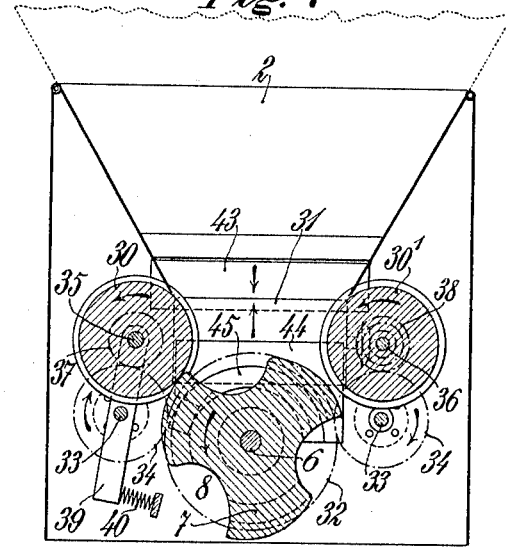
Figure 8:
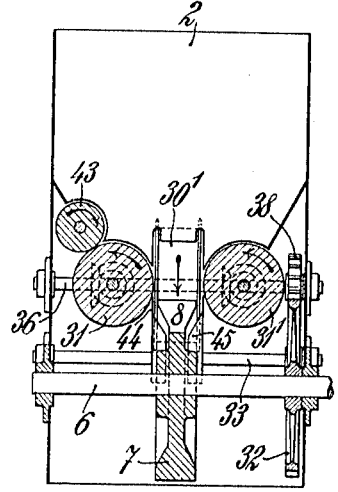
Figure 10:
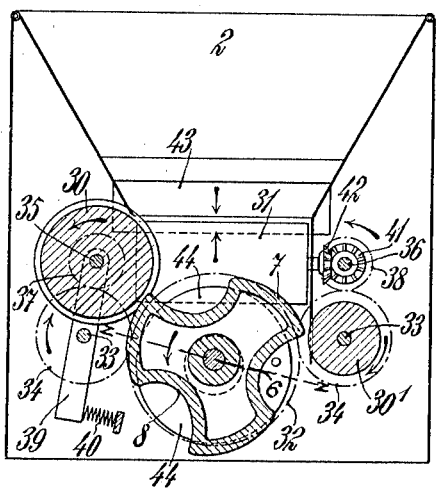
Figure 9:
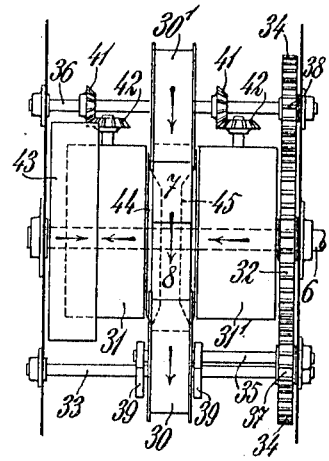

Figure 1 is a side elevation, Fig. 2 a plan of the machine in connection with a plow having two shares which are arranged in the usual way behind the potato sowing machine in such manner that the front share covers up the furrow already plowed and filled with seed potatoes, while the rear share forms the furrow required for the potatoes to be laid on the next journey. Figs. 3, 4 and 5 show a vertical section on line *a—a* of Fig. 2, a front elevation and a plan of the distributing device drawn to a larger scale, and Fig. 6 is a vertical section of a modified form of a distributer disk provided with two recesses. Figs. 7 and 8 show two vertical sections at right angles to one another of a modified machine according to this invention. Fig. 9 is a plan of the distributer device of Figs. 7 and 8 with the container omitted. Fig. 10 is a vertical section of another modification, and Fig. 11 a horizontal section on line *z—z* of Fig. 10.

According to Figs. 1 to 6, on the frame 1 of a double share plow of the usual type a hopper 2 is mounted in a casting 3, consisting of two portions, to the lower cylindrical part 4 of which the distributer pipe 5 is attached. In the casing 4 a disk 7 revolves on a horizontal shaft 6 and is provided with one (Fig. 3), two (Fig. 6) or more peripheral recesses 8, each of which is intended to remove a seed potato from the hopper 2 and transfer it to the distributer pipe 5. The size of the recesses 8 may be varied for different sized seed potatoes by placing insets of varying thickness (see Fig. 6 in dotted lines) in the recesses. The distributer disk 7 is of such shape that the front peripheral edge $8^1$ of each recess 8, in the direction of rotation of the disk, is at a greater distance from the axis than the rear edge $8^2$ of the recess. Immediately above and across the disk 7 two dispersing rollers 10 are journaled in the sides of the casting 3 which rotate in the opposite direction to one another from inward to outward. Above and transverse to the rollers 10 two agitating rollers 11 are journaled in the sides of the casting 3 which both rotate in the same direction.

On the wheels 12 of the plow rotating when it is in motion, the chain 13 drives the double chain wheel 15, loosely mounted on the shaft 14, which rotates the coupling member 17 loosely mounted on the shaft 6 by means of the chain 16. The shaft 6 with the distributer disk 7 can be rotated by means of the coupling clutch 18 which is adjustable on the shaft 6. On the shaft 6 a large toothed wheel 19 is mounted which meshes with a broad toothed wheel 20 fixed on the shaft 21 having a bevel wheel 22 at the other end which meshes with a bevel wheel 23 on the axle of one of the rollers 11. Fastened to the other end of this axle is a chain wheel 24, which is coupled by a chain 25 with a chain wheel 26 of the same size on the axle of the other roller 11, so that both rollers 11 rotate with the same velocity, and in the same direction. Meshing with the broad toothed wheel 20 is another toothed wheel 27 fixed on the axle of the front roller 10 and causing it to rotate. The other roller 10 is driven by a toothed wheel 28 on the shaft 6 and meshes with a toothed wheel 29 keyed fast on the axle of the roller 10.

By the action of the machine the seed potatoes fall separately from the hopper 2 into the recesses 8 of the rotating distributer disk 7 by which they are transferred to the distributer pipe 5. Owing to the peculiar shape of the distributer disk 7, the seed potatoes in the hopper 2 are raised each time before a potato falls into a recess 8 of the distributer disk 7, resulting in the seed potatoes being transferred regularly from the hopper 2 to the recesses 8, and damage to the potatoes remaining in the hopper being prevented by the two rollers 10, rotating in opposite directions, which remove the superfluous potatoes from the periphery of the distributer disk 7. The agitating rollers 11 keep the seed potatoes in the hopper constantly moving and thus prevent choking.

In the modification of the machine according to Figs. 7 to 9, the distributer 7 is provided with three recesses 8 and is mounted at the outlet of the hopper 2 on the horizontal shaft 6. The lower container is further closed by the two pairs of rollers 30, 30$^1$, 31, 31$^1$. The rollers or disks 30, 30$^1$ provided with wheels are of the same breadth as the distributer disk 7 and are rotated in the same direction as the latter. The rollers 31, 31$^1$ which are journaled transversely to the rollers 30, 30$^1$, both rotate in the same direction. The axles of the two pairs of rollers are all arranged approximately in a horizontal plane tangential to the outer periphery of the distributer 7. The rollers are driven in the following manner:—Mounted on the shaft 6 of the distributer 7 is a large spur gear wheel 32 meshing with two small toothed wheels 34 on the shafts 33 which drive the toothed wheels 37 and 38 on the axles 35 and 36 of the rollers 30, 30$^1$, so that both rollers 30, 30$^1$ rotate in the same direction as the distributer 7. The shaft 35 of the roller 30 is journaled in two levers 39 oscillating on the shaft 33, so that on the transference of larger sized potatoes the roller 30 can swing outward away from the same, thus obviating damage to the seed potatoes. After the passage of the larger potatoes, the roller 30 is returned to the normal position by the pressure between the teeth of the wheels 34 and 37. This return of the roller 30 may be further assisted by a pressure spring 40 acting on the lower arm of the lever 39. Two bevel wheels 41 mounted on the shaft 36 drive the bevel wheels 42 on the axles of the rollers 31, 31$^1$. Against the roller 31, which has the tendency to advance the potatoes toward the side of the hopper 2, a small roller 43 rests loosely which is rotated by friction by the roller 31 in the opposite direction and prevents the seed potatoes becoming heaped up against this side of the hopper. The distributer disk 7, which is thinner toward the center, is inclosed between two fixed plates 44 at its upper half, which limit the apertures 8 laterally. The arc-shaped cut lower edges 45 of the plates 44 are bent relatively to one another to form a sort of trough and run eccentrically to the distributer disk 7 toward the outlet of the machine. Owing to these eccentric edges 45 potatoes which may become jammed in the distributer disk 7 will be removed, thus assuring the seeds being laid regularly in the furrows. It is preferable to arrange the plates 44 adjustable in respect to the distributer disk 7 in order to be able to admit and fix the distance between the sheets 44 for different sized seeds.

Figure 11:
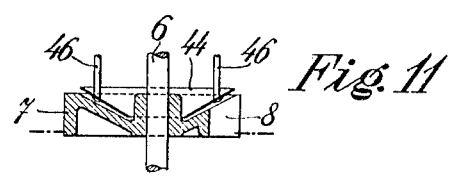

In the modification of the distributer device according to Figs. 10 and 11, the agitating roller 30$^1$ is mounted directly on the toothed wheel shaft 33, so that the roller 30$^1$ revolves in the opposite direction to the roller 30. This arrangement of the roller 30$^1$ is the best for preventing the formation of internal hollow spaces in the grouped seeds in the hopper. Further the distributer disk 7 is only made conical toward the center on one side and a plate 44, adjustable by means of the pin 46, is provided on this side alone.

Having now described my invention what I claim as new and desire to secure by Letters Patent is:—

1. In a potato planting machine, the combination with a seed hopper, of a recessed disk for distributing the seeds, the recesses being so formed that the forward edge of each recess in the direction of rotation is raised to a greater axial distance from the axis of the disk than the rear edge of said recess, whereby the seeds are loosened by the action of said disk before the recess is in position to receive a seed from the hopper.

2. A potato planting machine comprising in combination, a hopper containing seed potatoes, a grooved disk for distributing the potatoes, means for driving the disk, and rotary dispersing rollers mounted in operative relation to the distributing disk, the groove in the disk being such that the front edge is radially farther distant from the axis of the disk than the back edge.

3. A potato planting machine, comprising in combination, a hopper containing seed potatoes, a grooved disk for distributing the potatoes, rotary dispersing rollers mounted in coöperative relation to the disk, means for driving the disk and dispersing rollers, agitating rollers arranged above and transversely of the dispersing rollers, and means for driving the agitating rollers in the same direction.

4. A potato planting machine, comprising in combination a hopper containing seed potatoes, a grooved disk for distributing the potatoes, the groove on one edge in the direction of rotation being at a greater distance from the axis than the back edge, rotary dispersing rollers mounted in coöperative relation to the disk, means for driving the disk and dispersing rollers, agitating rollers arranged above and transversely of the dispersing rollers, and means for driving the agitating rollers in the same direction.

5. A potato planting machine, comprising in combination a hopper containing seed potatoes, a grooved disk mounted in a horizontal plane for distributing the potatoes, dispersing rollers mounted also in a horizontal plane in operative relation to the distributing disk, agitating rollers also in a horizontal plane arranged transversely of the dispersing rollers and tangential to the periphery of the distributing disk, and means for driving the latter, the dispersing rollers in opposite directions and the agitating rollers in the same direction.

6. A potato planting machine comprising in combination, a hopper, a grooved distributing disk, dispersing rollers mounted in operative relation to the distributing disk, agitating rollers arranged transversely of the dispersing rollers, means whereby one of the agitating rollers may yield outwardly, and means for driving the disk, the dispersing and the agitating rollers.

7. A potato planting machine comprising in combination a hopper, a grooved distributing disk, dispersing rollers mounted in operative relation to the distributing disk, agitating rollers arranged transversely of the dispersing rollers, levers for supporting one of the agitating rollers adapted to swing on the shaft of an intermediate wheel, which transmits the rotational movement from the shaft of the distributer disk to the axle of the yielding agitating roller, and means for driving the distributing disk and the dispersing rollers, and the agitating rollers.

8. A potato planting machine comprising in combination, a hopper, a grooved distributing disk, dispersing rollers mounted in operative relation to the distributing disk, agitating rollers arranged transversely of the dispersing rollers, means whereby one of the agitating rollers may yield outwardly, a small roller loosely journaled against one of the agitating rollers for moving the potatoes toward the sides of the hopper and rotated by friction in the opposite direction, and means for driving the disk, the dispersing and the agitating rollers.

In testimony whereof I affix my signature in presence of two witnesses.

ANTON JAMES PAULY.

Witnesses:
 ALFRED KLOSS,
 AUGUST FUGGER.

---

Copies of this patent may be obtained for five cents each, by addressing the "Commissioner of Patents, Washington, D. C."